United States Patent [19]

Ziller

[11] 4,334,500

[45] Jun. 15, 1982

[54] SHIPPING CONTAINER FOR LIVE ANIMALS

[76] Inventor: Henry H. Ziller, Rte. 2, Box G56, Hammond, La. 70404

[21] Appl. No.: 72,909

[22] Filed: Sep. 6, 1979

[51] Int. Cl.³ .................................................. A01K 1/00
[52] U.S. Cl. ....................................................... 119/15
[58] Field of Search ...................... 119/15, 17, 18, 19

[56] References Cited

U.S. PATENT DOCUMENTS

| | | | |
|---|---|---|---|
| 3,343,520 | 9/1967 | Schwarz, Jr. ................... | 119/15 |
| 3,537,428 | 11/1970 | Montgomery ................... | 119/15 X |
| 4,215,649 | 8/1980 | Vorbeck ........................... | 119/15 |

FOREIGN PATENT DOCUMENTS 1419505 12/1975 United Kingdom ................ 119/17

Primary Examiner—Gene Mancene
Assistant Examiner—Robert P. Swiatek
Attorney, Agent, or Firm—Charles C. Garvey, Jr.

[57] ABSTRACT

Animal shipping container comprising a gas impermeable canopy having an entrance opening at its bottom. The entrance opening is covered by a pair of flanged members forming a gas transfer chamber and constituting part of the floor of the container. A polymer film membrane, held between the flanged members, permits diffusion of gases into and out of the container interior.

12 Claims, 3 Drawing Figures

SHIPPING CONTAINER FOR LIVE ANIMALS

BACKGROUND OF THE INVENTION

1. Field of the Invention

The present invention relates to shipping containers for small animals and more particularly relates to a shipping container for small animals such as small reptiles, turtles, and the like, wherein a sealable shipping container isolates the animal to be shipped from other living organisms such as bacteria, viruses, and the like by the use of a gas permeable air diffusion polymer membrane shield, which membrane allows passage of molecular substances such as air for satisfaction of the animals metabolic needs.

2. General Background and Prior Art

In the pet industry for example, there exists the need for the safe and sanitary transportation of live animals in interstate commerce.

The pet turtle industry for example, transports many thousands of small turtles which will be used as pets for children for biological study and the observation of animal life and behavior. Such shipment provides this source of nature and wildlife to even urban areas where such wildlife are not inhabitants and thus not readily available. Hatchling turtles, as an example, are usually small, and can be easily kept in a small aquarium or the like by the child for observation, etc.

A problem exists in the bulk transport of many small turtles or like animals in a common container. While the small animals can now be hatched in a relatively germ free sanitary environment, they become during shipment vulnerable to bacteria such as salmonella, and virus attack. This bacteria and virus problem poses a threat to humans which might handle small turtles infected by such pathogens.

Information concerning the possible role of pet turtles in the transmission of the Salmonella pathogen to humans first began to appear in literature in 1965. Various studies were done leading to the conclusion that some Salmonellosis in humans could be attributed to improper handling of pet turtles by owners.

In an effort to locate the origin of Salmonella in turtles, the Center for Disease Control in Atlanta studied the turtle farm environment in 1969 to determine the efficacy of chemical treatment of the turtle pond itself to eliminate Salmonella. This early study concluded that:

"Based on our present knowledge this procedure will be difficult, if not impossible, considering the multiplicity of factors involved. All possible sources from the environment would have to be eliminated, all breeding turtles would have to be examined, and the Salmonella carriers removed, and a means of decontaminating pond water would have to be found."

"Turtle-Associated Salmonellosis" American Journal of Epidemiology, Vol. 95, No.: 6 1972 A. F. Kaufman et al.

At the time these studies were made, little was known about the manner in which Salmonella entered the ogranism of the baby turtle. Since then research has indicated that the Salmonella organism comes in contact with the turtle egg as it is being laid, and that infection is through the pores of the egg into the yolk, albumin portion. Turtle eggs removed by dissection from the female prior to being laid, do not contain Salmonella.

Until this discovery was made, it was thought that Salmonella in turtles could be eliminated by immersing the animals in a disinfectant bath. Following this approach, turtles were "certified" as disease free by state health laboratories and shipped to domestic markets. These "certified" disinfected turles were later found to have Salmonella, making it appear that turtle farmers were unable to produce the Salmonella-free turtle and state health laboratories were unable to detect it in the certification process.

The first action to ban the sale of domestic turtles was lodged as an administrative petition before the Food and Drug Administration by the Consumers Union on Dec. 10, 1973. Following that petition and with the concurrence of the Communicable Disease Center, F.D.A. published its Notice of Proposed Rule Making, in the Federal Register on May 28, 1974. These proposed regulations were stated in the alternative: Should F.D.A. ban the sale of turtles altogether, or impose stringent new certification procedures instead? A comment period was established and numerous comments received, most of which favored the total ban, since it did not appear likely that a Salmonella-free turtle could be developed or that state laboratories could be entrusted with the certification task.

Following the comment period, the Food and Drug Administration, through its Commissioner, imposed a complete ban on the sale of pet turtles by virtue of an Order printed in the Federal Register on June 23, 1975, at 40 Fed. Reg. 22543.

The majority of the comments received in the Administrative hearing process touched upon the seriousness of Salmonellosis on the one hand, and the "inhumane" treatment which turtles would receive if an industry proposal for a dry habitat (to avoid Salmonella) were followed.

Since turtles share much anatomy and physiology with birds, it was a natural process that the turtle industry appropriate from the poultry industry technology to solve the Salmonella problem. To market Salmonella-free turkeys, the poultry industry, with the Shearing Corporation, developed an antibiotic, "Gentamicin". This antibiotic is highly effective against Salmonella strains, and has been approved by the F.D.A. in 1974 for the use in the poultry industry.

The adaptation of this technology represents a new concept in turtle farming. Never before has it been applied anywhere. This system is the vanguard of turtle farming and promises to free the turtle industry from diseased products as it did the poultry industry.

To understand the effect of this method, it is necessary to understand the reproductive behavior of the turtle and some history predating the current method of egg treatment. The female turtle, following mating, stores sperm in a seminal receptacle where it remains viable, depending on the species, for several years. The laying season coincides with the seasonal increase in water temperature and photoperiod and begins by the female siphoning water into the cloacal region, primarily the colon and accessory bladders. The physiological reasons for this laying behavior are two fold: it may facilitate the egg laying per-se by acting as a peristaltic stimulant and a cloacal lubricant, or it may also be used in some cases as a ground softner prior to nest construction. The female turtle exits the water and begins to search for an area to lay her eggs. As she searches, she carries this water. When she finds some suitable area for nesting, she will begin to dig out a small shallow area the size of which is dependent upon the species of the turtle. If the selected area is too hard for her to dig, she will soften the area by emptying water from her colon and accessory bladders. If on the other hand, the ground is soft and she is able to easily build a nest, the water held in the cloacal region of the colon and accessory bladders will be passed prior to egg laying. So in either case, the eggs are laid in a bed which has been coated or saturated by the water brought up by the female, which contains Salmonella. The Salmonella level increases as the pond warms in the summer months. This is why late season hatchlings (untreated) have a higher probability of infection than early hatchlings.

The Salmonella infection also occurs as the eggs pass through the cloaca region where the digestive tract empties. Now the female turtle, depending on species, usually covers the egges with the earth surrounding the nest material, earth which itself is saturated with Salmonella infected pond water brought up in the accessory bladders and colons of other turtles.

In times past, turtle farmers, in an attempt to mimic nature, collected these eggs and packed them in moss, wet saw dust, sand or simple left them in the dirt until harvest. As these eggs were removed from the nest, they carried with them the coating of Salmonella left by the water and their exposure to the cloaca.

Disinfection must obviously take place soon after egg laying in order to be effective. The manner of disinfection has been the subject of much trial and error. Originally a gentamicin dip was attempted. It was only partially successful and had problems, the first of which was the tremendous number of naturally occuring soil bacteria. Second, a lot of soil organic material was attached to the egg periphery.

Because of these problems, Dr. R. J. Siebeling at Louisiana State University in Baton Rouge, Louisiana, modified the procedures to include the following steps: First, the turtle farmer gathers his eggs one to four hours after they are laid. The eggs are then washed with warm water (35° C. or 95° F.) to remove loose soil, dirt and sand. Following the washing, the eggs are dipped for five minutes in a cleansing solution of chlorox which contains 230 ppm of chlorine. This reduces the bacteria load to which the Gentamicin will be exposed. These two steps reduce the bacteria load from 5000 26000 to about 80600 per gram of egg, a factor of about 400. The third step is to expose the egg to Gentamicin and to force the antibiotic into the egg by means of a pressure differential. The pressure differential can be generated by several methods, one of which is to create a partial pressure by means of a vacuum (and this is the method currently in operation). In this situation a container which appears very much like a modified pressure cooker, is attached to the vacuum pump. The device is filled with the 1000 ppm Gentamicin solution in which the eggs are placed. Approximately 1500 turtle eggs can be treated simultaneously. The container is sealed and a partial vacuum of 26 inch Hg. is maintained for five minutes. This degasses the turtle egg interior. At the end of that time, the vacuum is released and the eggs are allowed to soak for ten minutes, allowing the Gentamicin to invade the egg and kill the last of the Salmonella.

Following the Gentamicin penetration the eggs are sealed in plastic containers and stored in a clean environment during incubation.

After hatching, the turtles are examined, counted, culled, and situated in containers for shipping. These containers elevate the turtles by means of wire tray over a disinfectant solution to isolate the turtles from their own waste.

The above information outlines the problems of infection faced by the turtle industry. The infection-free hatching of baby turtles has also been discussed in the above information. However, it would be desirable to provide a means for keeping the individual infection-free hatchling turtles isolated during their trip to the turtle farm to the individual consumer. It is to this problem that the present invention is directed.

It would thus be desirable to provide a shipping container which is simple to construct, easy to use, and inexpensive to manufacture which could safely and protectively transport a hatchling turtle, or like animal in interstate commerce. Such a container would preferably house only one animal at a time and would be germ free initially and would be sealed during shipment until being opened by the consumer.

It would be desirable that the container have some filtration means for preventing the entrance of bacteria, virus, and the like into the inner container space, yet at the same time allow the entrance of air and like gases necessary for the metabolic well being of the animal to be shipped.

Several containers for transporting or shipping small animals have been patented. Many such containers relate to the transfer of live fish in an aquatic environment. The present invention does not attack the problem of the aquatic environment, but rather a dry environment for the transfer of air breathing animals such as reptiles and other small like creatures.

In U.S. Pat. No. 3,537,428 there is provided a "Ventilated Cage Particularly For Pathogen-Infected Animals". An animal cage forms an air tight enclosure with an access opening and a removable closure having a ventilating opening with a filter. A sheet of chromar, a glass fiber sheet highly loaded with chromatographic sorbent is taught as the viral pathenogen filtering material. A vacuum port on the cage adapts the cage for receiving a vacuum for drawing air from the cage so that any air leakage will be inward rather than outward.

In U.S. Pat. No. 2,949,882 there is seen a live fish package which utilizes a flexible transparent closed thermoplastic sack filled with water and also having a space above the water filled with oxygen.

U.S. Pat. No. 3,728,988 attacks the problem of packaging live shrimp in an aqueous habitat medium. The aqueous habitat includes a container such as a polyethylene bag having an aqueous habitat medium disposed in the bag. An outer corrugated paper carton is used about the entire assembly with the bag being disposed in the carbon.

U.S. Pat. No. 3,549,381 issued to W. G. Kissinger provided a packaging material. The Kissenger patent provides a flexible impervious packaging material used especially for food packaging when the film is stretched across the object to be packed.

A shipping and storage container for aquatic life is seen in U.S. Pat. No. 3,168,887 issued to B. R. Bodell. A receptacle is provided having a water impervious envelope which is a thin translucent wall of silicone rubber having a low moisture transmission rate and a relatively higher oxygen and carbon dioxide permeability.

In U.S. Pat. No. 3,638,784 there is provided a two compartment unitary bag.

In U.S. Pat. No. 3,791,346 there is taught a "Rodent Habitat" which has a perforated upper roof for ventilation and a screen floor allowing animal droppings to pass through the screen to a removable tray.

3. General Discussion of the Present Invention

The present invention solves these many prior art problems and shortcomings which have long plagued at least the pet turtle industry. The present invention provides a shipping container which is inexpensive to manufacture, of simple construction and easy to operate.

The present invention provides a preferably self supporting shipping container providing an outer animal container housing which is in part a self supporting integral gas impermeable wall having an inner animal support floor attached during use to the container housing. An entrance opening is provided on the container which allows the placement of a small animal to be shipped into the container interior space. A gas permeable polymer shield covers and spans at least the opening during operation and prevents the entrance of living organisms such as bacteria and viruses into the container inner space.

In the preferred embodiment, the polymer shield is a polymer film sheet of, for example polyethelene. The present invention also provides in the preferred embodiment a gas transfer chamber attached to and covering the entrance opening to the container housing with the polymer film shield being protectively contained within the gas transfer chamber.

In the preferred embodiment the gas transfer chamber comprises a pair of spaced apart self supporting and generally parallel members which can be fused together at, for example, their peripheral edge portions. In the preferred embodiment, the two members comprise a base adapted to support the entire container, and an animal support floor spaced above the base, with the air diffusion membrane being suspendedly mounted therebetween during operation.

Thus, it is an object of the present invention to provide an animal shipping container which is simple to manufacture, and inexpensive to manufacture and easy to use.

It is another object of the present invention to provide an animal shipping container having an inner space which is initially bacteria free and virus free prior to the shipment process.

It is another object of the present invention to provide a shipping container for animals which protects the animal being shipped from external bacteriological contamination.

It is another object of the present invention to provide an animal shipping container which protects the handling of public from exposure to bacteria produced by the animal being shipped which animals may carry pathenogens, microorganisms, or their digestive tracts.

It is another object of the present invention to provide a shipping container which is individually adapted to carry a single specimen and which is adapted to prevent the infection or cross-contamination of other specimens being transmitted therewith.

Another object of the present invention is to provide an animal shipping container which is crush resistant, thus furnishing a suitable environment for the animal during the shipment process.

It is another object of the present invention to provide a shipping container which is biologically sound, providing the metabolic needs of the animal being shipped during the shipment process.

It is another object of the present invention to provide a sealable shipping container which can be closed after the animal to be shipped is inserted within the container inner space.

Still another object of the present invention is to provide a shipping container which allows only gas permeation between the container inner space and the external environment.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
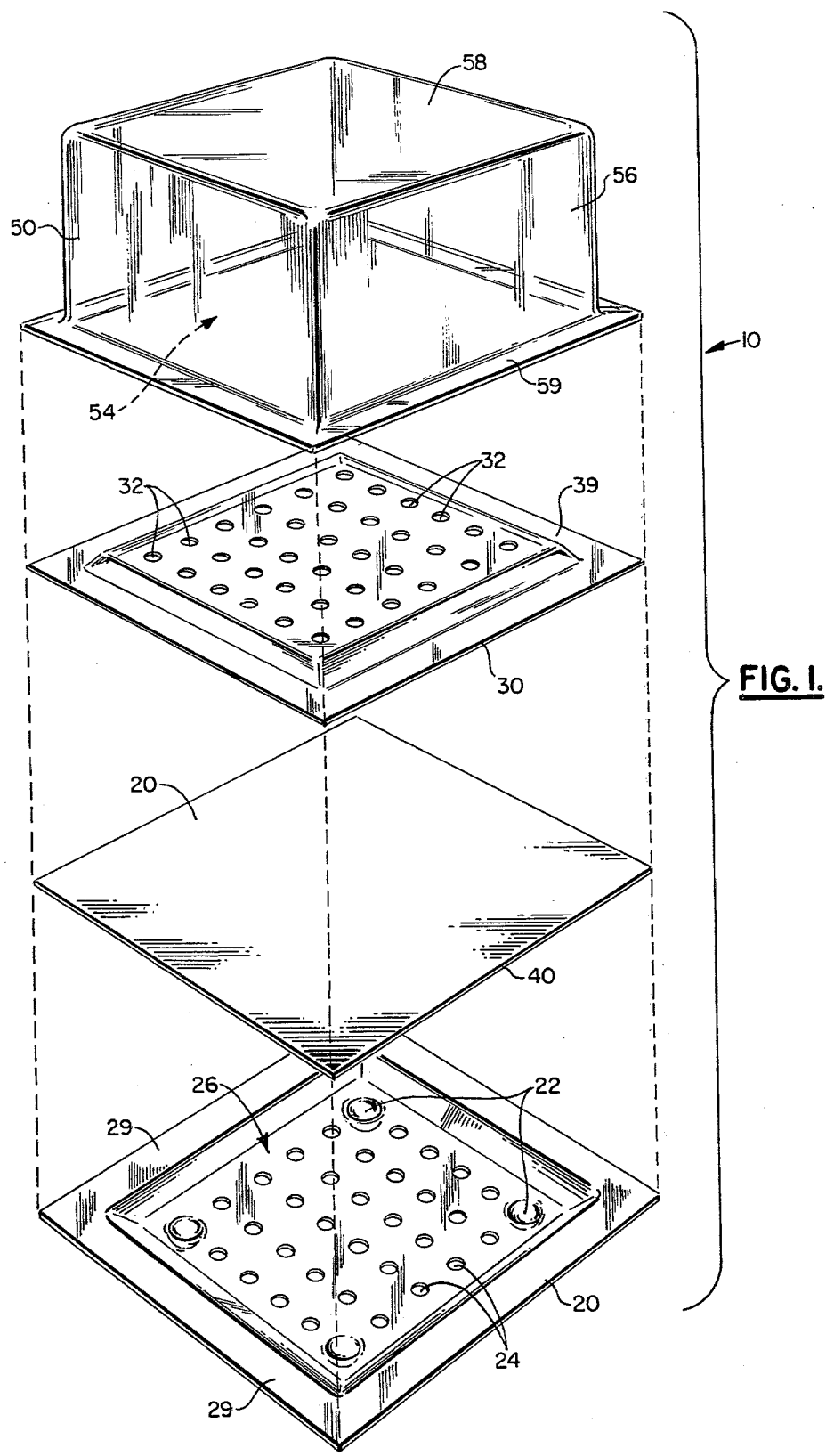
FIG. 1 is an exploded perspective view of the preferred embodiment of the apparatus of the present invention.
Figure 2:
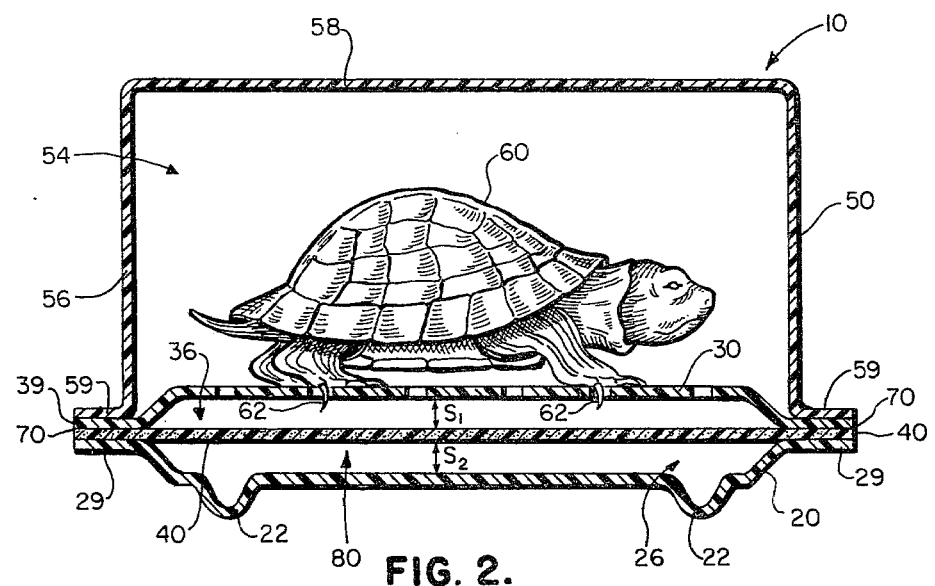
FIG. 2 is a sectional view of the preferred embodiment of the apparatus of the present invention.

FIGS. 1 and 2 best illustrate the preferred embodiment of the apparatus of the present invention designated generally in the drawings as numeral 10.

Shipping container 10 comprises generally a base 20, and an impermeable canopy 50, which are fused together during operation. Also provided is an animal support bore 30 which cooperates with base 20 to form a gas transfer chamber 80 (see FIG. 2), having an air diffusion membrane 40 mounted therebetween during operation. As will be discussed more fully hereinafter, membrane 40 is a gas permeable polymer membrane which allows the passage of molecular substances, gases such as oxygen and carbon dioxide to and from the container inner space 54 during operation which molecular substances supply the metabolic needs of the animal being shipped. Such shipment provides this source of nature and wildlife to even urban areas where such wildlife are not inhabitants and thus not readily available. A hatchling turtle 60 is schematically shown in the drawings as the animal to be shipped in container 10. It should be understood, however the other such animals could be shipped in container 10 if the metabolic needs of the animal are supplied by sizing container 10 and membrane 40 appropriately, so that enough air could travel through membrane 40 to the animal being contained.

Base 20 as shown in FIG. 1 provides a plurality of support legs 22. Air diffusion openings 24 are provided in base 20 which allow the passage of air through. Openings 24 could be for example one milimeter in diameter and for the needs of a small turtle 60 should be spaced on the order of one opening per square centimeter. Base 20 provides a peripheral base sealing flange 29 which, as will be discussed more fully hereinafter, is adapted to a diffused together with the flangess 59, 39 provided on canopy 50 and support floor 30, respectively.

Animal support floor 30 as best seen in FIG. 2 is spaced above base 20 at the central portion thereof. Support floor 30 likewise provides a plurality of air passage or air diffusion openings 32. Openings 32 in support floor 30 would also be for example one millimeter in diameter and spaced on the order of one opening per square centimeter.

Figure 3:
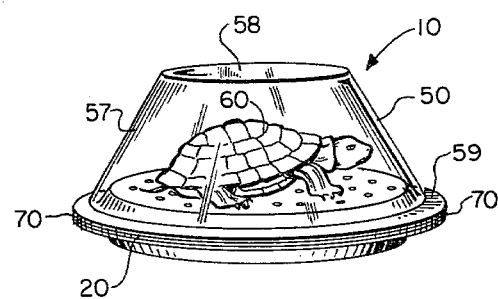
FIG. 3 is a perspective view of a second embodiment of the apparatus of the present invention.

Impermeable canopy 50 provides an inner space 54 sized to appropriately carry the animal 60 to be shipped. A plurality of side walls 56 and top 58 are provided. As shown in FIG. 3, walls 56 could be curved side walls 57.

The combination of support floor 30 and base 20 provide together a gas transfer chamber 80. In FIG. 2, gas transfer chamber 80 is seen as comprising floor 30, base 20 and air diffusion membrane 40 sandwiches therebetween. Note that canopy 50, floor 30 and base 20 all provide peripheral sealing flanges, 59, 39 and 29 respectively. In FIG. 2, there can be seen a peripheral sealing flange 59 of canopy 50 as well as a sealing flange 39 portion of floor 30 with the flange 29 of base 20 being seen best in FIG. 1.

The respective flanges 59, 39, and 29 as well as membrane 40 are sized correspondingly so that they will register together in a face to face sealing fashion during assembly. The corresponding size of flanges 59, 39 and 29 are best seen in FIG. 1. It would be desirable that these flanges have their peripheral edges dimensioned accordingly so as to fit together since heat or chemical sealing will fuse them together in the preferred embodiment.

In FIG. 2 a welded seam 70 is seen which amounts to each of the three flanges as above discussed being heat sealed together with air diffusion membrane 40 being likewise fused therewith between the flange 39 and flange 29 of floor 30 and base 20 respectively.

Note from an inspection of FIG. 2 that a floor space recess 36 and a base recess 26 are provided to floor 30 and base 20 respectively. Each recess is provided because of the "pie-pan" configuration of floor 30 and base 20. This recess provided to each member provides a spacing S-1, S-2 of, for example, one centimeter (1 cm) as seen in FIG. 2 to form the desirable gas transfer chamber 80. As aforedescribed, floor 30 and base 20 are perforated so air can freely enter and leave chamber 80. This is desirable, since the permeation of air into or from container space 54 will be through membrane 40 which allows the diffusion of molecular gaseous structure as air therethrough, but at the same time prevents the entrance or exit of larger living things including microorganisms, bacteria, and viruses. It would be desirable that no living organism be able to penetrate membrane 40 including organism such as viruses, which can penetrate other filter media such as microperforated filter media which has Milipore filters and the like. It should be appreciated that even viruses are many orders of magnitude larger than molecular gaseous structure. A comparison of virus size to molecular gaseous size would be like comparing the size of a high rise building to a golf ball.

The present invention teaches the use of a gas permeable polymer membrane for air diffusion which dissolves the permeant firstly into the permeable membrane 40 on the side of highest concentration. Then, the air diffuses toward the side of lowest concentration of the membrane 40, a process which depends on the formation of "holes" in the plastic network due to thermal agitation of the chain segments. Finally the permeant becomes desorbed on the side of higher concentration. In contrast to this, when permeating through porous materials, the permeating molecule does not change from an undissolved state to a dissolved state and does not form transient "holes" in passage. It can be seen from the above, that the use of the above described polymeric membrane 40 only allows molecular-sized elements to pass through the membranes such as air, carbon dioxide, and the like. Viruses and bacteria will not be allowed to penetrate the membrane and the organism being transported will be completely insulated and protected from the outside environment. It can be appreicated from the above, that several such containers could be shipped together in mass without cross-contamination at all.

Gas transfer chamber as shown in FIG. 2 provides a spacing (S-1 and S-2) of, for example, one centimeter to floor 30 above membrane 40 and to base 20 below membrane 40. This spacing provides a protection which disallows the puncture or other rupture of membrane 40 which would render it useless. The claws 62 of turtle indicate that the animal itself could penetrate membrane 40 if it were placed into proximity with the animal 60 being shipped. It can be appreciated that membrane 40 would also be protected by base 20 from external puncture as by a curious child, or during shipment for example.

Membrane 40 would preferably be a polymer having minimal thickness so as to allow gas permeation. A membrane thickness of less than one half mil is preferred. Suitable polymer films for membrane 40 include polyethylene, polystyrenes, polyolefins, polypropylene, polyurethane, polydimethylbutadiene (trade name—neoprent), teflon FED (also known as Fluoronated ethylene—propylene copolymer), ethylcellulose and silicone rubber. The above membrane films are all transparent, as is desirable.

Canopy 50, base 20 and floor 30 would also be transparent, but would be much thicker as a self supporting plastic construction would necessarily produce thicknesses of one six-teenth to one quarter inch, for example. Any suitable self supporting plastic having above specified thickness for self support such as a polyolefin would be suitable for base 20, floor 30 and canopy 50.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:
1. An animal shipping container comprising:
 a. a self-supporting animal container housing comprising an outer wall portion having an inner space and an animal support floor attached to said container housing at the lower portion of said inner space;
 b. an entrance opening in said container;
 c. a polymer film membrane covering at least said opening and preventing the entrance of living organisms into said container, said polymer film membrane preventing the travel of microorganisms across said membrane to or from said inner space, such polymer membrane allowing gaseous transfer thereacross by diffusion; and
 d. a pair of flanged members defining at least in part said support floor, each having flanged edges and being protectively placed on each side of said membrane, said flanged members being joined at their flanged edges, air openings being placed in each of said flanged members allowing air to circulate to said film membrane.

2. The live animal shipping container of claim 1, wherein said flanged members define therebetween a gas transfer chamber and said polymer film membrane is disposed within said gas transfer chamber.

3. The live animal shipping container of claims 1 or 2 wherein said polymer membrane is an olefin.

4. The live animal shipping container of claim 3, wherein said membrane is a polyethylene membrane.

5. The live animal shipping container housing of claim 1, wherein said animal container comprises a gas impermeable canopy, said entrance opening having a peripheral sealing flange adapted to register with and cooperatively connect with the flanges of said flanged member upon assembly.

6. The live animal shipping container of claim 5, further comprising means for fusing together the sealing flanges of said canopy and of said gas flanged members.

7. A live animal sanitary shipping container comprising:
  a. a support base providing at least one air passage opening therethrough;
  b. an animal support floor having at least one air passage opening and mounted on said base during operation with a gas transfer chamber being formed between said base and said floor;
  c. an impermeable canopy sealably attached during operation to the assembly of said base and said floor, said canopy providing an entrance opening and an inner space, said gas transfer chamber spanning said entrance opening of said canopy, and air flow into said canopy being only through said gas transfer chamber; and
  d. a non-porous gas permeable polymer membrane attached across the central portion of said gas transfer chamber, and being sealed at its edges between said base and said support floor.

8. The live animal shipping container of claim 7, wherein said floor and said base each provide peripheral cooperating sealing flanges adapted for registered connective placement during operation with said membrane therebetween.

9. The live animal shipping container of claim 7, wherein said floor and said base each provide outer sealing flanges and inner recessed portions, said sealing flanges being connected face-to-face during operation and said recesses cooperating to define said gas transfer chamber.

10. The live animal shipping container of claim 7, wherein said membrane is an olefin film membrane.

11. The live animal shipping container of claim 7, wherein said membrane is polyethylene.

12. An animal shipping container comprising:
  a. a self-supporting animal container housing comprising an outer wall portion having an inner space and an animal support floor attached to said container housing at the lower portion of said inner space;
  b. an entrance opening in said container housing wall;
  c. a gas transfer chamber attached to and covering said entrance opening, said support floor being attached at least in part to said as transfer chamber;
  d. a polymer film membrane attached to the inner portion of said gas transfer chamber, said polymer film membrane preventing the travel of microorganisms across said membrane to or from said inner space.

* * * * *